United States Patent [19]

Selenke

[11] 4,022,917
[45] May 10, 1977

[54] PROCESS FOR PREPARING A STORAGE STABLE PREMIXED BATTER

[76] Inventor: William M. Selenke, 18 Gambier Circle, Greenhills, Ohio 45218

[22] Filed: Dec. 12, 1975

[21] Appl. No.: 640,173

Related U.S. Application Data

[63] Continuation-in-part of Ser. No. 313,088, Dec. 7, 1972, abandoned.

[52] U.S. Cl. .................. 426/331; 426/99; 426/532; 426/553; 426/554
[51] Int. Cl.² .................................. A21D 10/04
[58] Field of Search .......... 426/89, 97, 98, 99, 426/532, 331, 552, 553, 650, 554

[56] References Cited

UNITED STATES PATENTS

| | | | |
|---|---|---|---|
| 1,264,592 | 4/1918 | Atkinson | 426/552 |
| 3,021,220 | 2/1962 | Going et al. | 426/554 |
| 3,034,899 | 5/1962 | Tucker | 426/552 |
| 3,109,738 | 11/1963 | Tucker | 426/552 |
| 3,275,450 | 9/1966 | Holstein | 426/552 |
| 3,275,451 | 9/1966 | Holstein | 426/552 |

*Primary Examiner*—Raymond N. Jones
*Attorney, Agent, or Firm*—Wood, Herron & Evans

[57] ABSTRACT

Storage stable aqueous batters are provided for use in the preparation of leavened culinary products. To the batter is added a quantity of powdered edible acid sufficient to maintain the pH at an acid level below about 5 to inhibit microbial growth. Particles of alkaline leavening agent, encapsulated in a water insoluble coating are also added to the batter. The alkaline leavening agent is capable of dispersing in the batter ingredients at a cooking temperature safely above the storage temperature to release the leavening agent into the acid batter mixture, thereby neutralizing the acid, and leavening the product. The batter premixture is storable with preservation against microbial growth, and the acid-base leavening system isolated to avoid pre-reaction prior to preparing a leavened product.

9 Claims, 3 Drawing Figures

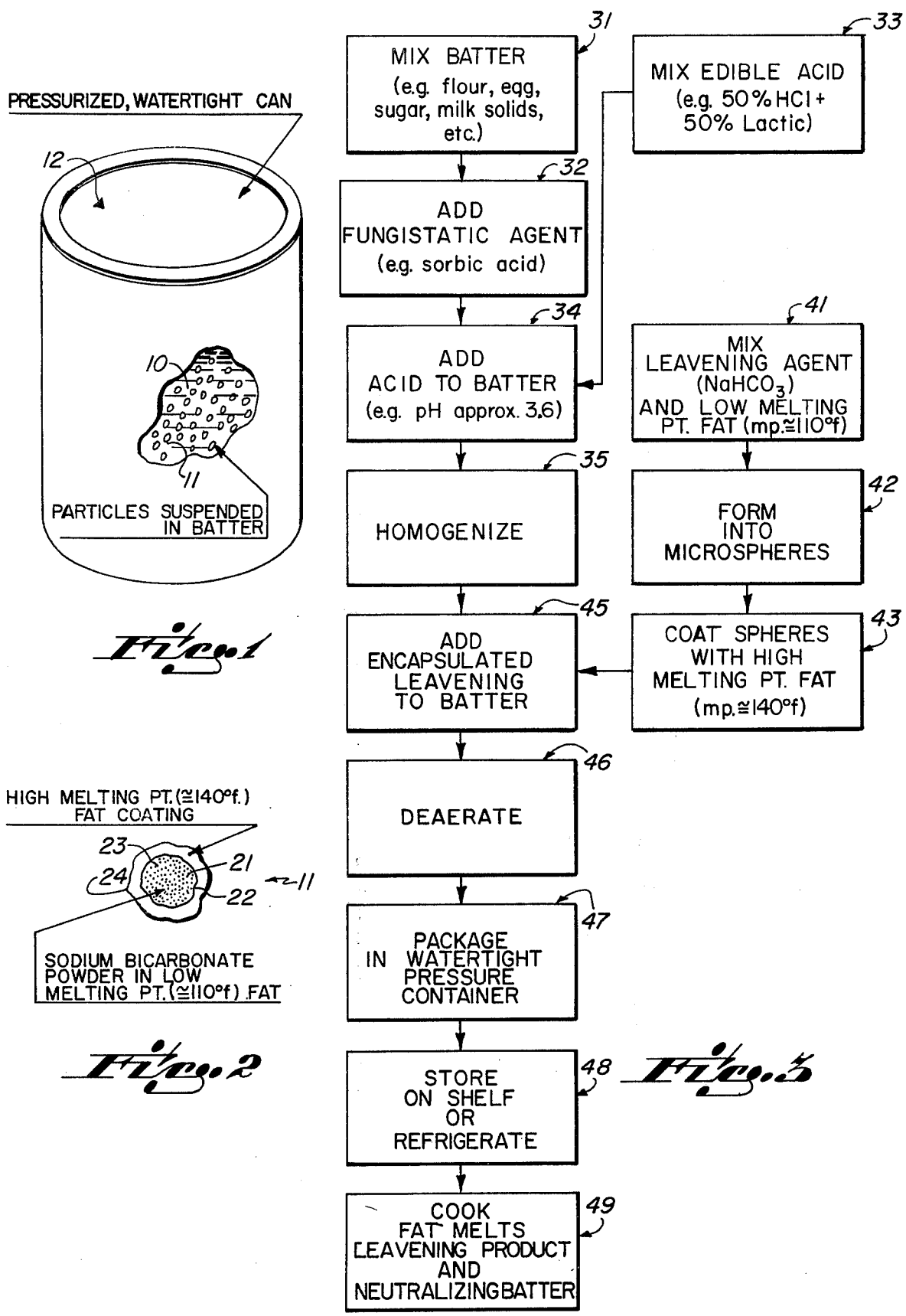

PROCESS FOR PREPARING A STORAGE STABLE PREMIXED BATTER

RELATED APPLICATION

This application is a continuation-in-part application of William M. Selenke, filed Dec. 7, 1972, Ser. No. 313,088, entitled "Storage Stabler Premixed Batter", now abandoned.

BACKGROUND OF THE INVENTION

The present invention relates to premixed culinary batters and particularly to a storage stable batter and method of preparing the same.

The primary consideration in the packaging of any food product is that of food preservation. It is essential in any food product which is susceptible to spoilage through bacterial and mold growth and intended to be consumed more than a few days after packaging, that steps be taken to inhibit microbial growth, e.g., the spoilage bacteria and mold growth in the packaged product. It has long been recognized that techniques such as freezing the product, retort canning the product, and preserving the product through addition of chemical biostatic and fungistatic agents can, in many cases, be employed with satisfactory results.

The freezing process, of course, requires constant refrigeration from the time of packaging until the time of consumption of the product. It has certain limitations in that some products do not lend themselves to freezing without some change in the properties of the product and thawing the product may be inconvenient.

The process of retort canning involves the heating of the product at the time of retort canning or packaging to destroy all bacteria and molds in the product and, thus, render the product sterile. Usually, the products are first packaged or canned, and then the container is heated to some temperature for a specified amount of time. The limitations of this process reside in that it is not suitable for use with products which cannot tolerate the high temperatures at this stage. Specifically, certain products will cook at the sterilizing temperatures. This, in some cases, may not be desirable, particularly in cases in which the product is a batter or the like which is to be cooked immediately prior to consumption. In other cases, it may not be desirable to cook the product at all.

The addition of chemical additives to the product can, in some cases, be effective to inhibit the growth of the bacteria and mold. However, certain food products possess chemical properties which are inconsistent with the conditions under which the biostatic and fungistatic agents are effective. For example, it is known that certain agents work more effectively when the food product is maintained at a low pH level. However, in many cases, a low pH level cannot be maintained in a food product due to inter-reaction of the ingredients of the product with the acid. This is especially the case with premixed batters for use in the preparation of baking products such as bread, biscuits, pancakes, and the like. These products require the presence of a leavening agent which generally cannot exist in a low pH solution without reacting with the acid of the solution.

For example, U.S. Pat. Nos. 2,810,650 (Joslin), 3,275,451 (Holstein) and 3,170,795 (Andre) disclose that leavening action results from the reaction of an acidulant in the presence of a gas producing compound. It is also appreciated by these patents that premature leavening of such compositions is to be avoided. These patents suggest the incorporation of an acidulant whose acidity is activated by the baking temperature for reaction with the gas producing bicarbonate. The delayed acting acidulants disclosed are dicalcium phosphate dihydrate, alpha-glucoheptono-gamma-lactone and glucono-delta-lactone, respectively in these reference patents. U.S. Pat. No. 3,021,220 (Going) similarly discloses that gas-producing chemical leavening agents should not be added to the batters prior to the heating step, and, if used should preferably be added just prior to the baking of the batters by the ultimate consumer. U.S. Pat. No. 328,419 (Marsh) discloses an acid lactate baking powder in which the acid and alkaline salts are protected from reaction during storage by the presence of a fatty material. U.S. Pat. No. 1,264,592 (Atkinson) also suggests the prevention of pre-reaction of baking powder by fatty separation of components.

However, to applicant's knowledge, it has not heretofore been known how to prepare batter premixes that are manufactured dry and are stable at room or refrigeration temperatures for indefinite periods when liquified by the ultimate consumer. Likewise, liquid batters can be manufactured that are effectively stable in the liquid state at refrigeration or room temperatures for weeks or months.

SUMMARY OF THE INVENTION

It is a primary objective of the present invention to provide a premixed batter-like mixture which is stable in storage in its resistance to internal bacteria and mold growth but which is capable of being used at any time after prolonged storage to form a leavened product. Thus, the invention relates to the preparation of dry batter premixes which are stable in storage as well as storable aqueous batters which are ready for cooking by the consumer. The present invention is primarily intended for use in the preparation of premixed batters or doughs such as canned pancake batter and the like which can be stored either under refrigeration or on the shelf at room temperature for an extended time with resistance to bacteria and fungus growth but nonetheless which can be immediately used to form a leavened pancake, cakes, or the like by cooking.

It is a primary objective of the present invention to prepare a dry batter premixture which is chemically and microbiologically stable before and after it is mixed with liquid. The dry premix is advantageous in that it is less expensive to manufacture and market since it does not require constant refrigeration. It may only require refrigeration for storage after it is mixed with liquid. The storable aqueous batters are advantageous in that the consumer need only cook them to make a satisfactory leavened product. In either the dry or liquid state, the batter premixtures would be storage stable for at least several weeks and even months at either room or refrigeration temperatures.

The present invention is predicated in part upon the concept of maintaining a premixed batter at a low acidic pH level, i.e., a pH of about 5 or less to inhibit microbial growth, while isolating the acidified batter and the alkaline leavening ingredients of the mixture. The quantities of acid and alkaline leavening ingredients in the premixture are such that, upon leavening, the acid is neutralized to a level above a pH of 5, i.e. about 6 to 7. Typically, these leavening ingredients include an alkaline leavening agent such as sodium bicarbonate which produces gas upon reaction with the acid ingredients of the batter. Preferably, an alkaline leavening agent is suspended in the batter in small micro-spheres or particles coated or encapsulated in a normally water-insoluble edible material capable of dispersion in said batter at a temperature between a maximum expected storage temperature and a higher cooking temperature to thereby release the leavening agent during cooking. A suitable water insoluble coating material is a fat or shortening which has a melting point above the storage temperature and which softens or disperses at such temperature to release the leavening agent for reaction with the acidified batter to produce leavening of the batter during cooking. In the case of batters and such having a normal ingredient thereof which is a fat or shortening which is insoluble in water, this substance is preferably used as the coating agent for the alkaline leavening agent.

More particularly, the present invention provides, in one specific embodiment thereof, a premixed pancake batter which has added thereto a sufficient quantity of edible acids, preferably a combination of concentrated hydrochloric and lactic acids to maintain the pH of the mixture below a level of approximately 5 and preferably 4 for refrigerator stable batters and below a level of approximately 4 and preferably 3.5 for shelf stable batters. The term "shelf stable" refers to stability at normal room or ambient temperatures. While the effective pH levels may differ for different batter compositions, it has been found that for shelf stable batters the pH level should be approximately 0.5 to 1 lower than the level required to maintain the same batter at refrigerator conditions. By stable it is meant that the batter will resist spoilage due to appreciable bacterial and fungus growth for a period of from a few weeks to several months. The low pH level of the batter is primarily responsible for retarding the growth of bacteria and micro-organisms of this nature, while the fungus growth is inhibited through the addition of certain known and conventional fungistatic agents such as sorbic acid and the like. It is known that these ingredients are usually most effective in lower pH solutions, and therefore, in the combination of the present invention, their more effective use is provided.

The encapsulation of the leavening-producing alkaline ingredients within a water-insoluble coating substance having a melting or aqueous dispersion point between the normal storage temperature and the cooking temperature will permit the mixture of the leavening ingredient into the batter without affecting the stable properties of the batter and will further allow for reaction of these ingredients upon cooking to both leaven the product and simultaneously raise the pH to a taste acceptable level for consumption.

For a powdered or dry batter product, powdered milk, powdered eggs and other dry ingredients are used. In this dry batter premixture, powdered acids such as tartartic and fumaric are used. For the powder or dry premix, sufficient powder acids are added so that when water or other liquids or ingredients are added to the mixture, the pH is lowered below about 5 to about 4. For liquid batter sufficient liquid or powder acids are added so that the liquid batter has a pH of about 4. Thus, when the batter is cooked the fatty substance melts releasing the alkaline leavening agent to neutralize the acid, thereby releasing carbon dioxide, and leavening the cooked culinary product.

In addition, to the advantages pointed out above, it has been discovered that with the present invention the glutenization or thickening of gluten-type batters during prolonged storage is prevented or substantially decreased. Thus, the present invention also provides a useful means of conditioning batters for refrigeration and also for freezing where glutenization is normally a problem.

These and other objects and advantages of the present invention will be more readily apparent from the following detailed description of the drawings illustrating a novel batter and method of preparing a batter and bakery product therewith together with a discussion of certain examples of specific embodiments of the present invention.

FIG. 1 is a perspective view of a pressurized, watertight container partially broken away to illustrate a batter according to the present invention packaged therein.

FIG. 2 is an enlarged cross sectional view of an encapsulated alkaline leavening agent micro-sphere of the mixture of FIG. 1.

FIG. 3 is a block diagram of the process of preparing a chemically leavened bakery product, such as that illustrated in FIG. 1 and representing the premixing of the batter to a storage stable condition and the subsequent cooking of the batter to a finished culinary product.

Referring to FIG. 1, a canned, premixed batter, such as a pancake batter, is illustrated according to one of the embodiments of the present invention. A batter 10 is a premixed batter containing the standard ingredients of a conventional pancake batter, such as flour, eggs, sugar, milk solids, and possibly some vegetable oil or shortening. The batter is premixed and partially homogenized. The leavening agent of the batter is suspended in the batter in the form of small micro-spheres, i.e. very small particles 11. The leavening agent in these spheres is coated with a water-insoluble material which will melt when the batter is heated during cooking to the final product. The encapsulation of the leavening agent in the micro-spheres 11 prevents reaction of the leavening agent with the acidic components of the batter. The micro-spheres are blended in the batter and, if necessary, the batter deaerated. The entire mixture is packaged in a watertight container, such as a pressurized can 12.

Referring now to FIG. 2, the encapsulated microspheres of the leavening agent are illustrated in more detail. The leavening agent itself is typically in the form of a powder substance 21, most commonly sodium bicarbonate. The leavening agent 21 is formed into small pellets 22 preferably through the use of a bonding agent 23. The bonded pellets 22 of the leavening agent 21 are then coated in a water proof but meltable or heat-dispersible coating substance 24. The coating 24 prevents reaction of leavening material with the ingredients of the batter until the material 24 is melted or dispersed upon the cooking of the batter so that the leavening agent 21 is then released into the batter.

The bonding agent 23 and the coating 24 may be of the same substance or may be of different substances. Preferably, at least one of these substances is comprised of a fat which will contribute to one of the ordinarily required ingredients of the batter, that of the shortening or oil. Normally, however, the oil or shortening substance in a batter is of a melting point of approximately 50°–110° F which is not sufficiently high to ensure that the coating will not melt or disperse during storage temperatures which may be encountered. Therefore, a higher melting point fat, such as Procter & Gamble's FIX-X, having a melting point of approximately 140° F, is preferred for the outer coating. Whereas the bonding agent may also be comprised of this substance, it may be suitable merely to pelletize the leavening agent under pressure or to bond it with a lower melting point fat. The latter is preferable in that it contributes to a quicker disbursement of the leavening agent into the batter upon cooking. The reason that the entire mircosphere is preferably not of the high melting point fat is that when such a high melting point fat substance is employed in a batter in high percentages, a noticeable aftertaste results in the product which it is desirable to avoid. Of course, it is suitable to introduce the leavening agent into the batter in pellets which are coated or encapsulated with other meltable or heat dispersible substances 24, and then to blend the fat or shortening agents into the batter in the conventional premixing step. For example, it may be desirable to coat or encapsulate the leavening agent in a hydrophobic liquid or solid material which protects the leavening agent during storage and from reaction with the acidified batter but which disperses the batter upon the application of heat during cooking to release the leavening agent for leavening the batter to produce a cooked leavened product.

By isolating the leavening agent from the remainder of the batter, the pH of the batter can be lowered by the addition of edible acids in accordance with the present invention to inhibit bacterial growth for preservation of the batter. Additionally, fungistatic agents to inhibit mold are added to the batter and, in the acidic environment, can operate more effectively and in smaller quantities.

Referring now to FIG. 3, a block diagram illustrating the method of preparation of the batter in accordance with the principles of the present invention is illustrated.

The first step in the preparation of the batter is mixing the standard ingredients of the batter, less the leavening agent, in a conventional process. These ingredients include flour, eggs, sugar, milk solids, and water, typically. This step is illustrated in block 31 of the diagram. After the initial composition of the batter has been mixed, a fungistatic agent is added to the batter as represented by block 32 in the diagram. The fungistatic agent inhibits mold growth in the premixed batter. This fungistatic agent is taken from a group of standard chemical additives which may include any GRAS approved fungistatic agents but preferably those having acceptable taste, such as sorbic acid and acetic acid. These acids have been tried and found effective for this prupose and they are therefore, preferred. Sorbic acid and/or acetic acid, or certain of their salts, are intended for purposes of this description to be equivalent to sorbic acid. These acids present the desirable properties of minimum change in the taste of the product and also of enhanced effectiveness at lower pH levels.

Simultaneous with the preparation of the batter in accordance with the steps set forth above, a separate mixture of edible acid is prepared as represented by block 33 in the diagram. This acid is preferably a strong acid which is FDA approved for use in food products of this type. Preferably, a mixture of 50% concentrated hydrochloric acid and 50% of an 85% strength solution of lactic acid has been found effective and is, therefore, preferred. This mixture is added to the premixed batter as represented by block 34 of the diagram.

The pH of the batter after addition of the acid is generally below the level of about 5 for general batter of this type to inhibit bacterial growth. Since inhibitions of bacterial growth will depend upon the type of bacteria and temperature of storage, this pH level will vary. However, below a pH level of 5, i.e., 4.7 or lower has been found effective to retard bacteria growth for refrigeratable products. If, however, room or ambient shelf-stable batters are desired, the pH is preferably below the level of approximately 4, or about 1 below the suitable level for refrigeratable batters. The pH of the batter is determined at about 24 hours after the mixture is made. The amount of acid added must be such as to compensate for any initial neutralizing reaction which might take place upon mixing of the batter ingredients.

After the addition of the acid, it may be desirable, although not always, to homogenize the batter as represented by block 35 in the diagram. A homogenization step is more often preferable for preparation of refrigerated products in that it tends to improve the flow of the batter at refrigerator temperatures.

At this step the present invention has provided a storage stable batter composition having reduced pH to retard bacteria growth and including a fungistatic agent for retardation of mold growth and the like. The batter is suitable for use in preparation of food products upon the subsequent addition of an alkaline leavening producing agent which, when added, raises the pH to a level of greater than 5, roughly 6 or 7 which presents a more acceptable taste for bakery products, such as pancakes and the like.

According to the preferred embodiment of the present invention, the leavening agent is suspended in the batter mixture prior to storage and chemically isolated from the batter mixture. This is achieved by first forming pelletized micro-spheres of the leavening agent, as represented by block 41 of the diagram of FIG. 3. This may be done in several ways which are conventional in the pharmaceutical art. One method which has been found acceptable is that of mixing the leavening agent, as for example, powdered sodium bicarbonate or baking soda, with a low melting point fat with the consistency of butter or margarine, for example, and shaping these into small pellets of approximately 0.05 inch in diameter. The formation into micro-spheres is represented by block 42 of the diagram.

The micro-spheres thus formed are coated in a waterproof substance having a melting point or aqueous dispersion temperature which is greater by a safe margin than any temperature expected to be encountered during storage. It has been found that a high melting point edible fat, such as Procter & Gamble's FIX-X having a melting point of about 140° F, is suitable for coating of the micro-spheres. This coating process, represented by block 43 of the diagram, may be achieved by quickly dipping cooled micro-spheres into a molten cooking substance and then quickly cooling the capsules by dipping in water.

The use of the high melting point fat has also been employed with success as a bonding agent. Even without an external coating of essentially pure fat, it has been found that a fairly homogeneous mixture of leavening agent plus high melting point fat is acceptable. However, upon mixing the pelletized particles with the batter, as is represented by block 45 in the diagram, a notable surface rection occurs during which a significant portion of the leavening agent and the acid of the solution react to neutralize each other. If this procedure is used, the pH referred to in block 34 above should be that which is measured at a time approximately 24 hours after the addition of the final ingredients at box 45. Thus, the pH referred to is that pH which will exist for the duration of the storage time after the initial reaction caused by mixing the ingredients as stabilized.

After the addition of the pelletized leavening agent, it may further be desirable to deaerate the solution, as represented by box 46 in the diagram. This step, however, is not absolutely essential, although in many cases it is preferable.

The batter at this stage is suitable for packaging in watertight containers which may be in the form of pressurized cans or plastic jars. The choice is optional dependent upon the manner of storage; this packaging step is represented by box 47 of the diagram.

The product, depending upon the pH and amount of fungistatic agent employed, may be suitable for storage at various temperatures. Normally, a refrigeratable product may be preferred which is storable at a temperature range of from 35° to 40° F. When the additional preservatives have been added to allow adequate preservation at higher temperatures, a shelf-stable batter will result which may be stored at room temperature. The product also may be suitable for freezing. It has been found that the mixture of the present invention, particularly the incorporation of the preserving acids, gives the additional advantage of providing a product which is better conditioned for refrigerator and freezer storage in that the acidification of the batter retards the thickening or glutenization of the batter. This storage step is represented by box 48 in the diagram.

After the product has been stored either in the retail establishment or on the consumer's shelf, the product may be cooked to form pancakes or whatever other bakery product is intended. The cooking step is represented by box 49 in the diagram. The cooking of the batter, when the encapsulated leavening is added, can be achieved by merely pouring the batter directly into a greased skillet and, upon contact with the high temperatures, the leavening agent will be released into the batter as the coating substance and bonding agent melt or disperse, thus reacting with the acid of the batter raising the pH to a more suitable and desirable level and leavening the product by the formation of carbon dioxide bubbles.

When the leavening agent has not been added in the form of suspended micro-spheres into the batter, it is added at this time to the preserved batter.

Other additives may also be desirable, using known techniques, to overcome other problems which may be encountered. Particularly, stabilizers may be added to prevent separation of the batter, and the addition of anti-oxidants, such as ascorbic acid, buylated hydroxy anisole, or buylated hydroxy toluene, may be desirable.

The following examples have been performed and the results are noted below. It can be seen that a highly stable and preserved batter results from the present invention. The 24 hour pH levels as noted in the Table below are those which were measured after the mixtures of ingredients had been allowed to stabilize for approximately 24 hours.

EXAMPLE 1

The following ingredients were mixed with a conventional mixer and blended into a smooth mass.

| | |
|---|---|
| 750 grams | Flour |
| 40 grams | Sugar (sucrose) |
| 70 grams | Non-fat dry milk |
| 65 grams | Liquid vegetable oil |
| 950 grams | Water |
| 250 grams | Eggs (5 eggs) |
| 10 grams | Vinegar (5% acidity) |
| 1.8 grams | Sorbic acid |
| 1 cc. | Polyoxyethylene sorbitan monooleate (a surface active agent) |

Six aliquots, each of 213 grams, were placed in individual containers labeled A through F and a 1:1 volume mixture of 85% lactic acid and 12 N HCl was added with blending to samples B-F in a total amount indicated by the Table which follows and the 24 hour pH levels were obtained. Sample A was maintained without further addition of acid. The six samples A-F were divided into equal parts and one part was stored at about room temperature (about 70° F) while the other part was stored under refrigeration at about 30°–40° F, both for about 3 months. pH levels at the end of the storage period were noted. The relative accuracy of pH measurement herein is ± 0.1.

TABLE

| Sample | Acid Added (cc) | 24 Hour pH | Three Months' Refrigerated | pH Room |
|---|---|---|---|---|
| A | None | 5.7 | 4.3 | 3.9 |
| B | 1 | 3.9 | 4.0 | 3.9 |
| C | 0.8 | 4.3 | 4.2 | 3.6 |
| D | 0.7 | 4.2 | 4.3 | 3.7 |
| E | 0.6 | 4.5 | 4.5 | 3.7 |
| F | 0.5 | 4.7 | 4.6 | 3.7 |

As demonstrated by the Table, samples B-F which had a 24 hour pH of below 5 (i.e., 3.9 to 4.7 ) remained virtually constant in pH after storage under refrigeration. The variation of ± 0.1, as mentioned, was within the experimental accuracy of measurement. This virtual lack of pH change indicated no adverse spoilage. Observation of Samples B-F indicated very minimal changes in color and smell confirming the lack of adverse spoilage or bacterial growth. Sample A, however, both under refrigeration and room temperature storage, exhibited spoilage. This was ascertained by pH change from 5.7 to 4.3 and 3.9, respectively, for both samples in storage and this indicated bacterial growth. Likewise, Sample A in both types of storage developed gaseous bubbles associated with spoilage. Furthermore, all Samples A and C-F (above 4.0 pH) spoiled upon room temperature storage for three months. In contrast, the Sample B at 3.9 did not spoil at room temperature and had acceptable taste.

Upon blending a 20 gram portion of Sample B (pH 3.9), which had been stored under refrigeration, with 0.71 gram of non-encapsulated mixture of 1 part FIX-X, 1 part Crisco (i.e. a Proctor & Gamble tradename for an all-purpose hydrogenated plastic shortening) and 1 part NaHCO₃ immediately prior to frying at 375° F, the appearance and taste of the pancake from the three month old batter was acceptable.

EXAMPLE 2

The following ingredients were mixed in a conventional mixer to form a smooth batter having a 24 hour pH of about 3.8.

| | |
|---|---|
| 150 grams | Flour |
| 8 grams | Sugar |
| 14 grams | Non-fat dry milk |
| 13 grams | Liquid vegetable oil |
| 190 grams | Water |
| 50 grams | Egg (1) |
| 4 grams | Vinegar (5% acidity) |
| 1.2 cc. | Concentrated HCl (12N) |
| 0.316 grams | Sorbic Acid |
| 1.2 grams | Lactic Acid |
| 0.2 cc. | Polyoxyethylene sorbitan monooleate |

Separately, a leavening agent of $NaHCO_3$ was encapsulated by first mixing 1 part by weight of the $NaHCO_3$ powder with 1 part by weight of Crisco to form a uniform suspension of powder in the Crisco. Then, the resulting mixture was broken up into small particles on the order of 1/16 to 1/8 inches. The particles were quickly dipped in a FIX-X fat bath heated at about 150° F. to coat them with the fat, after which the coated particles were solidified by dipping in dilute aqueous solution of polyoxyethylene sorbitan monooleate. The resultant particles each representatively comprised about 1 part by weight each of the $NaHCO_3$, Crisco and FIX-X.

Upon blending the abofe batter with 9.4 grams of the encapsulated leavening agent, the mixture exhibited room and refrigeration storage stability similar to the storage stability of the acceptable samples of Example 1. Furthermore, after frying the batter-leavening agent mix at a temperature in the order of about 400° F pancakes were prepared having a leavening comparable to freshly prepared batter and quite acceptable taste. Final pH of the prepared pancakes closely approximated 5.5 which was an entirely acceptable level similar to fresh pancakes. The pH of the cooked pancakes was determined by mixing the cooked pancakes with water to disperse the ingredients and measuring the aqueous mixture with a pH measuring apparatus.

EXAMPLE 3

The following ingredients were mixed as in Example 2 to form a smooth batter having a pH of about 3.65.

| | |
|---|---|
| 150 grams | Flour |
| 8 grams | Sugar |
| 14 grams | Non-Fat dry milk |
| 13 grams | Liquid vegetable oil |
| 190 grams | Water |
| 50 grams | Egg (1) |
| 2.2 grams | Vinegar (5% acidity) |
| 1.5 cc. | Concentrated HCl (12N) |
| 1.3 grams | Lactic acid |
| 0.316 grams | Sorbic acid |
| 0.2 cc. | Polyoxyethylene sorbitan monooleate |

An encapsulated leavening agent was prepared in the same manner exemplified in Example 2. 10.5 grams of the encapsulated leavening agent was added to the above batter. The storage stability of the resultant mixture was comparable to Example 2 and upon frying the stored batter, as in Example 2, equivalent cooked pancakes were made having a pH of about 6.2 with acceptable leavening and taste similar to freshly prepared pancakes.

EXAMPLE 4

To demonstrate the preparation of dry premix batter ingredients including powdered acid which may be made according to this invention, seven aliquots of dry mix were prepared containing the following ingredients:

| | |
|---|---|
| 62.5 grams | All purpose flour |
| 3.3 grams | Sugar |
| 5.83 grams | Dry milk |
| 5.42 grams | Crisco |
| 0.15 grams | Sorbic acid |

All aliquots received varying amounts of tartaric acid, except the control, and each received 100 grams of water after the dry mix was prepared. A pH was taken at 12 hours and after one week at refrigeration temperature 38° F.

| | | 12 hr. pH | 1 wk. pH |
|---|---|---|---|
| Sample 1 | Tartaric acid 1.0 gr. | 3.33 | 3.33 |
| Sample 2 | Tartaric acid 0.5 gr. | 4.04 | 4.06 |
| Sample 3 | Tartaric acid 0.4 gr. | 4.35 | 4.33 |
| Sample 4 | Tartaric acid 0.3 gr. | 4.7 | 4.6 |
| Sample 5 | Tartaric acid 0.2 gr. | 4.85 | 4.34 |
| Sample 6 | Tartaric acid 0.1 gr. | 5.33 | 4.01 |
| Sample 7 | No tartaric acid | 5.88 | 3.87 |

The above results are very comparable to the results of the liquid acid batters of Example 1, i.e., at pH below about 5, there was a lack of adverse spoilage or bacterial growth. In contrast, above about pH 5, sample 6 and 7 exhibited spoilage.

The powdered premixes of samples 1 to 5 may accordingly be mixed with the encapsulated leavening agent as reported in Example 2 as above to form a powdered premix which is storable and which upon liquification with water is preserved against microbial growth. Upon cooking at elevated temperatures in a manner similar to the above Examples, satisfactory leavened products are obtained.

The above examples are illustrative only, and it will be appreciated by those skilled in the art from the foregoing specification, that many variations in the ingredients may be employed. For example, other leavening agents such as $KHCO_3$, or alkaline carbonates such as $CaCO_3$ may be employed. As the term is used in the art, a leavening agent is a gas producing agent. Most commonly, the gas producing agent is sodium bicarbonate (baking soda) which releases carbon dioxide upon reaction with the aqueous acidic batter. Also, the encapsulation or coating of such agents may be accomplished by several different techniques which are used in the food industry. The several techniques for encapsulation include plating, emulsion encapsulation, spray drying and the like processes where a powdered or liquid leavening agent can be coated or encapsulated for performance in accordance with the principles of this invention. More particularly, in a conventional plating technique a suitable powdered leavening agent is placed in a mixer with a liquid coating material or melt composition as above. As a consequence of agitation in the mixer, the powdered particles become coated. In a typical spray-drying operation a leavening agent powder is mixed with a liquid or melt coating material and sprayed to form spheres of powder coated or encapsulated in the coating material. The third commonly empolyed prior art method is the technique of emulsion encapsulation. For example, in this method a leavening agent powder or liquid can be dispersed in an emulsion which is precipitated around the powder particles to form encapsulated leavening particles. It is to be understood, therefore, that the precise technique of encapsulation may vary according to well-known techniques.

What is claimed is:

1. A method for preparing a storage stable culinary product comprising the steps of
   a. forming an aqueous unleavened batter,
   b. adding to said batter a sufficient amount of an edible acid so as to lower the pH thereof to below about 5, and
   c. adding to said batter an edible alkaline leavening agent encapsulated in a normally water-insoluble, edible material, said alkaline leavening agent in a quantity sufficient to raise said pH to a level in the range of approximately 6 to 7, whereby said acid inhibits bacterial growth for preservation of said batter and is isolated from said leavening agent by said encapsulation.

2. The method of claim 1 wherein said agent is sodium bicarbonate.

3. The method of claim 1 wherein the edible material encapsulating said leavening agent is an edible fat.

4. The method of claim 2 wherein said agent further comprises a plastic hydrogenated shortening and a fat as the encapsulating material.

5. The method of claim 1 comprising the further step of adding to said batter an edible fungistatic agent.

6. The method of claim 5 wherein the edible fungistatic agent is sorbic acid.

7. A product prepared by the method of claim 1.

8. The method of claim 1 wherein said pH is in the range of about 3.9 to about 4.7.

9. The product prepared by the method of claim 7 wherein said batter comprises a mixture of flour, eggs, sugar and milk solids.

* * * * *